United States Patent
Metzger et al.

(10) Patent No.: US 12,030,400 B2
(45) Date of Patent: Jul. 9, 2024

(54) SYSTEM AND METHOD FOR AUTHENTICATING A CHARGING PROCEDURE FOR AN ELECTRIC VEHICLE AT A CHARGING STATION

(71) Applicant: Dr. Ing. h.c. F. Porsche Aktiengesellschaft, Stuttgart (DE)

(72) Inventors: Christian Metzger, Tamm (DE); Svetoslav Sultani, Stuttgart (DE); Iosif-Norbert Gaier, Oberriexingen (DE); Maikel Linckh, Ditzingen (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 446 days.

(21) Appl. No.: 17/364,995

(22) Filed: Jul. 1, 2021

(65) Prior Publication Data
US 2022/0009366 A1    Jan. 13, 2022

(30) Foreign Application Priority Data
Jul. 7, 2020 (DE) .................... 10 2020 117 836.0

(51) Int. Cl.
*B60L 53/30* (2019.01)
*B60L 53/68* (2019.01)
(Continued)

(52) U.S. Cl.
CPC ............. *B60L 53/305* (2019.02); *B60L 53/68* (2019.02); *H04W 4/40* (2018.02); *H04W 12/04* (2013.01); *H04W 12/06* (2013.01)

(58) Field of Classification Search
CPC ........ B60L 53/305; B60L 53/68; B60L 53/65; B60L 53/665; H04W 4/40; H04W 12/04;
(Continued)

(56) References Cited

U.S. PATENT DOCUMENTS 5,550,536 A * 8/1996 Flaxl .................... G06K 7/0008
  342/51
8,421,592 B1   4/2013 Gunasekara et al.
(Continued)

FOREIGN PATENT DOCUMENTS

CA      3005598 A1 * 11/2018 ............. G06F 21/34
CN    105826993 A     8/2016
(Continued)

OTHER PUBLICATIONS

Advam, "How to bridge the gap and digitalise your car park?", advam.com, https://www.advam.com/newsshub/how-to-bridge-the-gap-and-digitalise-your-car-park, Jul. 25, 2018, pp. 1-2, ADVAM, Australia.
(Continued)

*Primary Examiner* — Yonel Beaulieu
(74) *Attorney, Agent, or Firm* — LEYDIG, VOIT & MAYER, LTD.

(57) ABSTRACT

A method for authenticating a charging procedure for an electric vehicle at a charging station includes: checking, by a communication module, whether a connection exists to a network and to a back-end server; establishing, by the communication module, that no connection exists to the network and to the back-end server, and communicating that no connection exists to a processor; generating a message on a display device of a user interface indicating that an input of an authentication code is required to enable the charging procedure; comparing an entered authentication code with an authentication code stored in a storage unit of the charging station; and authorizing and enabling the charging procedure if the entered and stored authentication codes match one another, or refusing the charging procedure if the authentication codes do not match one another.

15 Claims, 3 Drawing Sheets

(51) Int. Cl.
*G06F 21/44* (2013.01)
*H04W 4/40* (2018.01)
*H04W 12/04* (2021.01)
*H04W 12/06* (2021.01)

(58) Field of Classification Search
CPC ..... H04W 12/06; H04W 12/033; H04W 4/44; Y02T 10/70; Y02T 10/7072; Y02T 90/12; Y02T 90/16; Y02T 90/167; Y04S 30/12; Y04S 30/14; G06F 21/44; G06F 21/46; G06F 2221/2133
See application file for complete search history.

(56) References Cited

U.S. PATENT DOCUMENTS

| | | | |
|---|---|---|---|
| 9,819,200 B2* | 11/2017 | Solomon | G06F 21/31 |
| 10,404,686 B2 | 9/2019 | Kim et al. | |
| 10,500,967 B2 | 12/2019 | Spesser et al. | |
| 2010/0315197 A1 | 12/2010 | Solomon et al. | |
| 2013/0038284 A1 | 2/2013 | Lafrance | |
| 2016/0229305 A1 | 8/2016 | Shumaker et al. | |
| 2018/0194241 A1* | 7/2018 | Hao | G06F 21/44 |
| 2019/0054835 A1 | 2/2019 | Liang et al. | |
| 2019/0160957 A1* | 5/2019 | Hooker | B60L 53/68 |
| 2022/0134898 A1* | 5/2022 | Bode | G06Q 20/409 320/109 |
| 2023/0211693 A1* | 7/2023 | Ahtikari | H04W 12/069 |

FOREIGN PATENT DOCUMENTS

| | | | | |
|---|---|---|---|---|
| CN | 106585393 A | | 4/2017 | |
| CN | 109228898 A | | 1/2019 | |
| GB | 2597739 A | * | 2/2022 | ............. B60L 53/64 |
| WO | WO-2016089925 A1 | * | 6/2016 | ......... B60L 11/1846 |
| WO | WO-2023275439 A1 | * | 1/2023 | |

OTHER PUBLICATIONS

Intel Corporation, "Solution brief—Revolutionizing Fast Charging for Electric Vehicles", Intel: Solution Brief, Dec. 2012, pp. 1-6, Intel, Santa Clara, California, USA.

Jiawei Li, et al., "RF-Rhythm: Secure and Usable To-Factor RFID Authentication", arXiv.org, arXiv:2003.08923v1, https://arxiv.org/abs/2003.08923, Mar. 19, 2020, pp. 1-10, Cornell University, Ithaca, New York, USA.

Kathleen Garska, "Two-Factor Authentication (2FA) Explained: RFID Access Control", https://blog.identityautomation.com/two-factor-authentication-2fa-explained-rfid-access-control, Sep. 11, 2018, pp. 1-4, Identity Automation Systems, LLC, Houston, Texas, USA.

* cited by examiner

SYSTEM AND METHOD FOR AUTHENTICATING A CHARGING PROCEDURE FOR AN ELECTRIC VEHICLE AT A CHARGING STATION

CROSS-REFERENCE TO PRIOR APPLICATION

Priority is claimed to German Patent Application No. DE 10 2020 117 836.0, filed on Jul. 7, 2020, the entire disclosure of which is hereby incorporated by reference herein.

FIELD

The invention relates to a system and method for authenticating a charging procedure for an electric vehicle at a charging station.

BACKGROUND

Instead of vehicles with an internal combustion engine, it is known for hybrid vehicles to be developed which are powered e.g. by an internal combustion engine and an electric motor, or electric vehicles which are powered by an electric motor which is fed from a battery or a fuel cell with hydrogen gas, for example, as the energy source. Electric vehicles, in particular, are becoming increasingly popular with customers.

Battery-powered electric vehicles have a traction battery which serves as an energy source for the travel drive of the electric vehicle. The battery can be charged in different ways at a charging station. A charging station for electric vehicles is a charging station which is designed specifically for electric vehicles and, in terms of its construction, usually resembles a fuel pump for conventional fuels. A charging station has one or more charging points, wherein, by definition, only one vehicle can be connected simultaneously to one charging point. In the simplest case, a charging point consists of a socket on which the vehicle can be charged via a cable connection and a charging device.

A distinction is made between different charging types. AC current charging, charging with three-phase current and fast charging with DC current at 400V to 800V thus exist. In the case of fast charging of the energy storage system of electric vehicles, substantial electrical powers with high DC voltages and DC currents are required. The higher the power, the faster the accumulator of the electric vehicle can be charged.

Some charging stations allow access to every user, whereas, at other charging stations, the electric vehicle can be charged only by users authorized to do so, in particular also to enable a secure billing and payment for the charging current that is drawn.

In order to safeguard the authorization, charging stations are connected via a mobile radio link or other network connections to a back-end server. An authentication of a user or of the vehicle to be charged can be performed via the server in order to identify the vehicle and check whether an authorization for a charging procedure exists. An authentication code, for example, such as, for example, an external identification means (EIM), is installed on the server in order to be able to perform an authentication of this type. The input of the authorization code is normally required for the start of a charging procedure, but it can also be deactivated. An external authentication is performed, for example, via a web-based application or a mobile software application such as an app which communicates with the back-end server. An internal authentication is normally performed via a transponder such as an RFID card. The corresponding reading device is installed on the charging pole. In both cases, the back-end server checks in each case whether the present user has an authorization to start the respective charging procedure.

However, no authentication can be performed if the network connection to the back-end server is defective. In this case, the following scenarios are possible:

a successful authentication is indicated to the user without said authentication actually having been performed; the user can, however, charge the vehicle and the charging energy is therefore made available to the user free of charge;

a successful authentication is indicated to the user, the user's authentication data entered by means of the RFID transponder are stored locally in a storage medium of the charging pole and a billing of the charging energy takes place when the connection to the back-end server has been restored;

a temporary deactivation of the authentication function is indicated to the customer; the user can, however, still charge the vehicle and the charging energy is made available to the user free of charge.

US 2010315197 A1 describes networked charging stations for electric vehicles for charging electric vehicles which are connected to a back-end server for charging stations for electric vehicles, said server performing the authentication for charging requests while a communication connection between the charging stations and the server is functioning correctly. If the communication connection is not functioning correctly, the networked charging stations for electric vehicles switch to a local authentication mode.

US 2019160957 A1 describes a charging system for charging an electric vehicle, comprising a charging station and a charging network server. The charging network server communicates via a network with the charging station and a mobile device application. An authentication code is stored on the charging network server and the charging station in order to authorize the charging of the electric vehicle if the charging station is disconnected from the charging network server. A charging authentication request transmitted from the mobile device application to the charging network server transmits the authentication code from the charging network server to the mobile device application. The charging of the electric vehicle is authorized if the authentication code entered into the charging station matches the authentication code stored in the charging station.

U.S. Pat. No. 8,421,592 B1 describes a charging station for charging an electric vehicle which has a transceiver with a local interface and a wireless WLAN interface. A user can transmit an authentication request to the local interface via their user transceiver. The charging station communicates with a front-end server via the WLAN interface. The charging station forwards the authentication request with an identification of the charging station to the front-end server and the front-end server creates a PIN code in response to the authentication request. A back-end server receives the PIN code and checks the identification of the charging station. The front-end server transmits the PIN code via the wireless WLAN interface to both the user transceiver and the charging station. The PIN code is used by the user to authenticate themself for the charging procedure.

SUMMARY

In an embodiment, the present invention provides a method for authenticating a charging procedure for an electric vehicle at a charging station, comprising: checking, by a communication module, whether a connection exists to a network and to a back-end server; establishing, by the communication module, that no connection exists to the network and to the back-end server, and communicating that no connection exists to a processor; generating a message on a display device of a user interface indicating that an input of an authentication code is required to enable the charging procedure; comparing an entered authentication code with an authentication code stored in a storage unit of the charging station; and authorizing and enabling the charging procedure if the entered and stored authentication codes match one another, or refusing the charging procedure if the authentication codes do not match one another.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
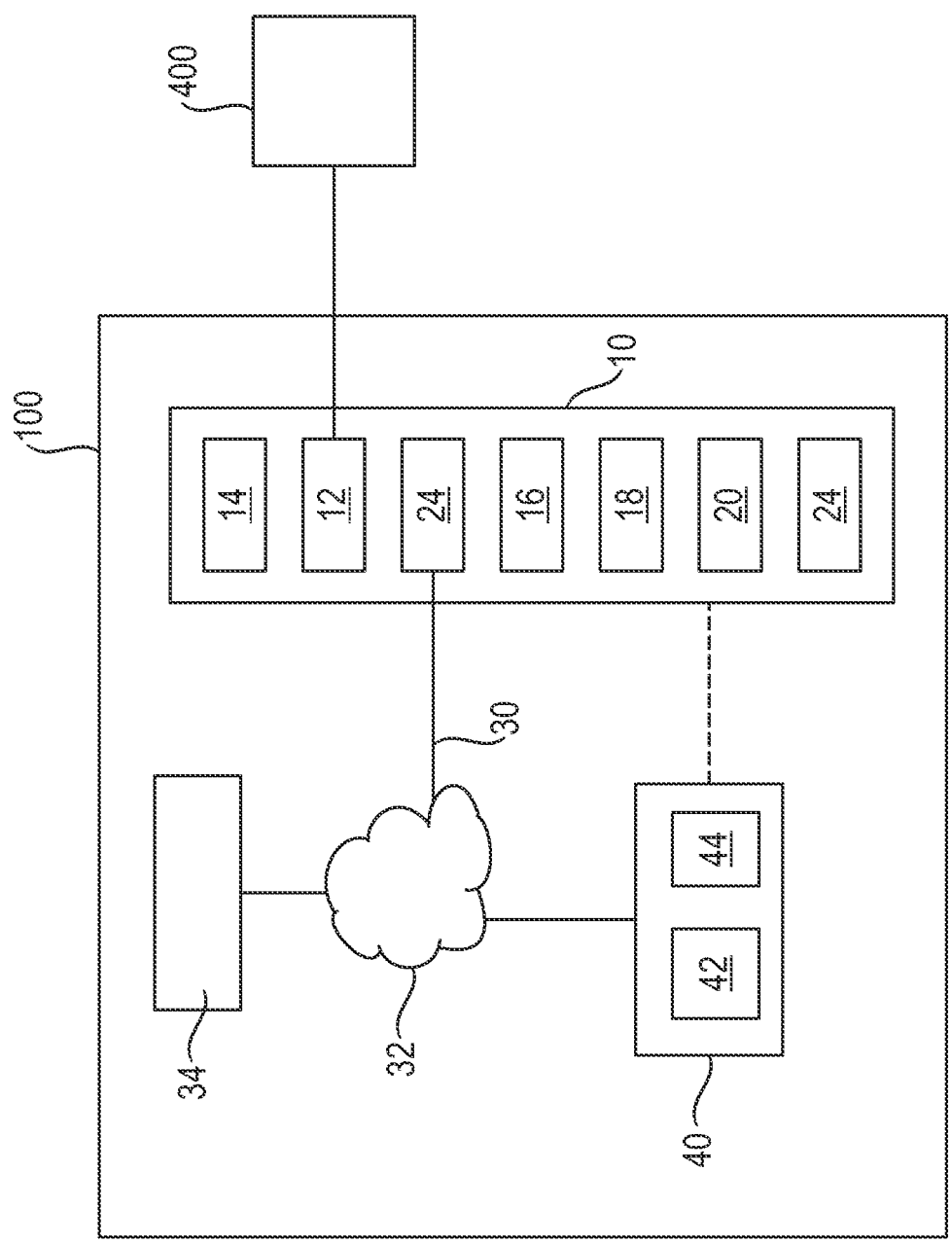
FIG. 1 shows a schematic view of an authentication system for authenticating a charging procedure for an electric vehicle at a charging station.

In an embodiment, the present invention provides a method and a system for authenticating a charging procedure for an electric vehicle at a charging station even if a connection to a back-end server is interrupted, characterized by high reliability and enabling simple implementation.

According to the present invention, a method is proposed by means of which an authentication of a charging procedure is enabled for an electric vehicle at a charging station even if the charging station is not connected to a back-end server, thus providing the basis for an access restriction and simultaneously a charging capability despite the loss of communication with the back-end server.

According to a first aspect, the invention provides a method for authenticating a charging procedure for an electric vehicle at a charging station. The method comprises the following method steps:
 checking, by a communication module, whether a connection exists to a network and to a back-end server;
 establishing, by the communication module, that no connection exists to the network and to the back-end server, and communicating this information to a processor;
 generating a message on a display device of a user interface indicating that the input of an authentication code is required in order to enable the charging procedure;
 comparing an entered authentication code with an authentication code stored in a storage unit of the charging station;
 authorizing and enabling the charging procedure if the entered and stored authentication codes match one another, or refusing the charging procedure if said authentication codes do not match one another.

In one development, it is provided that the authentication code is a 4-digit or 6-digit numeric or alphanumeric PIN code.

The authentication code is advantageously generated using a seed and key method.

In one embodiment, a seed is shown on the display device of the user interface and is transmitted by means of a mobile application of a mobile device to an authentication entity, wherein the authentication entity calculates an authentication code on the basis of the seed and transmits it to the mobile application on the mobile device.

In particular, the authentication entity is connected to the back-end server.

A detection of a transponder on a reading device of the charging station is advantageously required in order to enter the authentication code.

In one development, it is provided that the authentication code is transmitted in cryptographically encrypted form from the authentication entity to the mobile device.

According to a first aspect, the invention provides a system for authenticating a charging procedure for an electric vehicle at a charging station. The system comprises a charging station having a charging device and an energy source, a user interface, a storage unit, a processor and a communication module, wherein the charging station is connectable via the communication module by means of a mobile radio link to a network and to a back-end server, and wherein a mobile device is connectable to the network and to the back-end server and is connectable to the communication module of the charging station. A mobile application is installed on the mobile device. The communication module is designed to check whether a connection exists to the network and to the back-end server and, in the event of establishing that no connection exists to the network and to the back-end server, to communicate this information to the processor. The processor is designed to generate a message on a display device of the user interface indicating that the input of an authentication code is required in order to enable the charging procedure, to compare an entered authentication code with an authentication code stored in a storage unit of the charging station; and to authorize and enable the charging procedure if the entered and stored authentication codes match one another, or to refuse the charging procedure if said authentication codes do not match one another.

The authentication code is advantageously a 4-digit or 6-digit numeric or alphanumeric PIN code.

In one development, it is provided that the authentication code is generated in a seed key method.

In one embodiment, a seed is shown on the display device of the user interface and is transmitted by means of a mobile application of a mobile device to an authentication entity, wherein the authentication entity calculates an authentication code on the basis of the seed and transmits it to the mobile application on the mobile device.

In particular, the authentication entity is connected to the back-end server.

In one development, it is provided that, in addition to the input of the authentication code, a detection of a transponder on a charging device of the charging station is required in order to enter the authentication code.

The authentication code is advantageously transmitted in cryptographically encrypted form from the authentication entity to the mobile device.

According to a third aspect, the invention provides a computer program product which comprises an executable program code which is configured in such a way that, when executed, it carries out the method according to the first aspect.

FIG. 1 shows a charging system 100 for charging an electrically powered vehicle 400. The charging system 100 comprises a charging station 10 which has a charging device 12 and an energy source 14. The energy source 14 may be a power network of an electricity supply company, a generator, a battery, or a different device which is capable of supplying the charging device 12 with power. The charging station 10 is provided with a user interface 16 which can be designed, in particular, as a touchscreen or as a display screen with operating elements. The charging station 10 further has a reading device 18 for the contactless exchange of data, in particular by means of RFID technology or NFC technology through electromagnetic induction. The charging station 10 is further connected to a storage unit 20, a processor 22 and a communication module 24.

The charging station 10 is further connected via the communication module 24 by means of a mobile radio link 30 to a network 32 and to a back-end server 34. A mobile device 40 can further be connected via the communication module 24 to the charging station 10. A mobile application 42 is installed on the mobile device 40. The mobile device 40 is further equipped with a camera 44.

A "processor" can be understood in connection with the invention to mean, for example, a machine or an electronic circuit. A processor may, in particular, be a main processor or central processing unit (CPU), a microprocessor or a microcontroller, for example an application-specific integrated circuit or a digital signal processor, possibly in combination with a storage unit to store program commands, etc. A processor can also be understood to mean a virtualized processor, a virtual machine or a soft CPU. It can also be, for example, a programmable processor which is equipped with configuration steps to carry out said method according to the invention, or it can be configured with configuration steps in such a way that the programmable processor implements the features according to the invention of the method, the component, the modules or other aspects and/or partial aspects of the invention.

A "storage unit" or "storage module" and the like can be understood in connection with the invention to mean, for example, a volatile storage device in the form of a Random-Access Memory (RAM) or a permanent storage device such as a hard disk or a data medium or e.g. a replaceable storage module. However, the storage module can also be a cloud-based storage solution.

A "module" can be understood in connection with the invention to mean, for example, a processor and/or a storage unit for storing program commands. A module is specifically configured, for example, to execute the program commands in such a way that the processor and/or the storage unit perform(s) functions in order to implement or carry out the method according to the invention or a step of the method according to the invention.

The communication module 24 can have a serial communication adapter, a wired network adapter, a wireless network adapter, a mobile telecommunications adapter, a radio frequency receiver, an RFID reading device, a Bluetooth adapter, a Wi-Fi adapter, a ZigBee adapter, an NFC adapter and/or any other device which can be connected to one or more other devices. The communication module 24 can transmit and/or receive information to and/or from one or more different devices.

The user interface 16 can be configured to display information to a user, in particular to the driver of the electric vehicle 400 that is to be charged, and to receive inputs from the user. The user interface 16 comprises a display device which can be designed, for example, as a cathode ray tube (CRT), a liquid crystal display (LCD), a light-emitting diode (LED) display or organic LED (OLED) display. Additionally or alternatively, the user interface 16 can contain an audio output device (e.g. an audio adapter or a loudspeaker). The user interface 16 further contains an input device which is configured to receive one or more inputs from a user. The input device can comprise keys, buttons, keypads, display devices, cameras, a touch-sensitive operating panel (e.g. a touchpad or touchscreen), position detectors and/or audio inputs such as a microphone. The user interface 16 can be designed as a single component, such as, for example, a touchscreen display, which contains both the display device and the input device. In an embodiment of this type, a control or button can be displayed to prompt a user input on the touchscreen display.

Although only a single charging station 10 is shown in FIG. 1, in practice, a plurality of charging stations 10 which are connected to the back-end server 50 can be linked via the network 52. The network 52 may be the Internet, a local area network (LAN), a wide area network (WAN), a wireless LAN (WLAN), a virtual private network (VPN), a cellular network or a different network.

In one example embodiment, the mobile device 40 is a smartphone, a cell phone, a personal digital assistant (PDA) or a tablet on which the mobile application 42 is installed.

During the performance of a charging procedure for the electric vehicle 400 under normal conditions in which the charging station 10 is connected to the charging back-end server 50, the mobile application 42 of the mobile device 40 initiates a charging request by connecting to the server 34, and the server 34 then connects to the charging station 10 in order to authorize the charging procedure. The charging request from the mobile application 42 is linked to a specific user profile containing the billing information and/or contact information for the user, along with a vehicle identification, a vehicle manufacturer, a vehicle model, an AC current profile, the type of energy storage device of the vehicle 400 and/or other information relating to the vehicle 400 and/or the charging procedure.

In addition, the charging request comprises an identification of the charging station 10 from which the charging is requested, wherein the identification of the charging station 10 is performed, for example, by scanning an optical machine-readable code such as a barcode or a QR code at the charging station 10 by means of a camera 44 of the mobile device 40. If the user of the mobile application 42 is able to authenticate themself by means of the identification data communicated to the server 34, the user is authorized to start the charging procedure.

However, it is known that, for technical or other reasons, the data communication between the back-end server 34 and the charging station 10 can be temporarily interrupted, wherein the charging station 10 goes offline from the network 32. The communication with the back-end server 32 is therefore not available and the user of an electric vehicle would then not be able to charge their vehicle 400.

However, according to the present invention, a charging of the electric vehicle 400 is possible even if the communication between the server 34 and the charging station 10 is interrupted. The communication module 24 detects that the connection to the server 34 is interrupted and forwards this information to the processor 22. The processor 22 then outputs a corresponding alert on the display device of the user interface 16 indicating that the communication connection is interrupted and the input of an authentication code 50 is now required. The authentication code 50 can, for example, be a numeric or alphanumeric code, such as, for example, a 4-digit or 6-digit PIN (Personal Identification Number) code.

The authentication code 50 may be a static code which has been communicated to the user in advance in case the communication connection between the server 34 and the charging station 10 is not available. The entered authentication code 50 is compared with codes stored in the storage unit 20 and if the entered code 50 is identical to the stored code, the charging procedure is enabled. However, if, for example, an incorrect code 50 is entered three times, the charging procedure is not provided. As a result, however, no user-related billing is possible, since the probability of an unauthorized third party randomly entering a valid authentication code 50 is too high.

Figure 2:
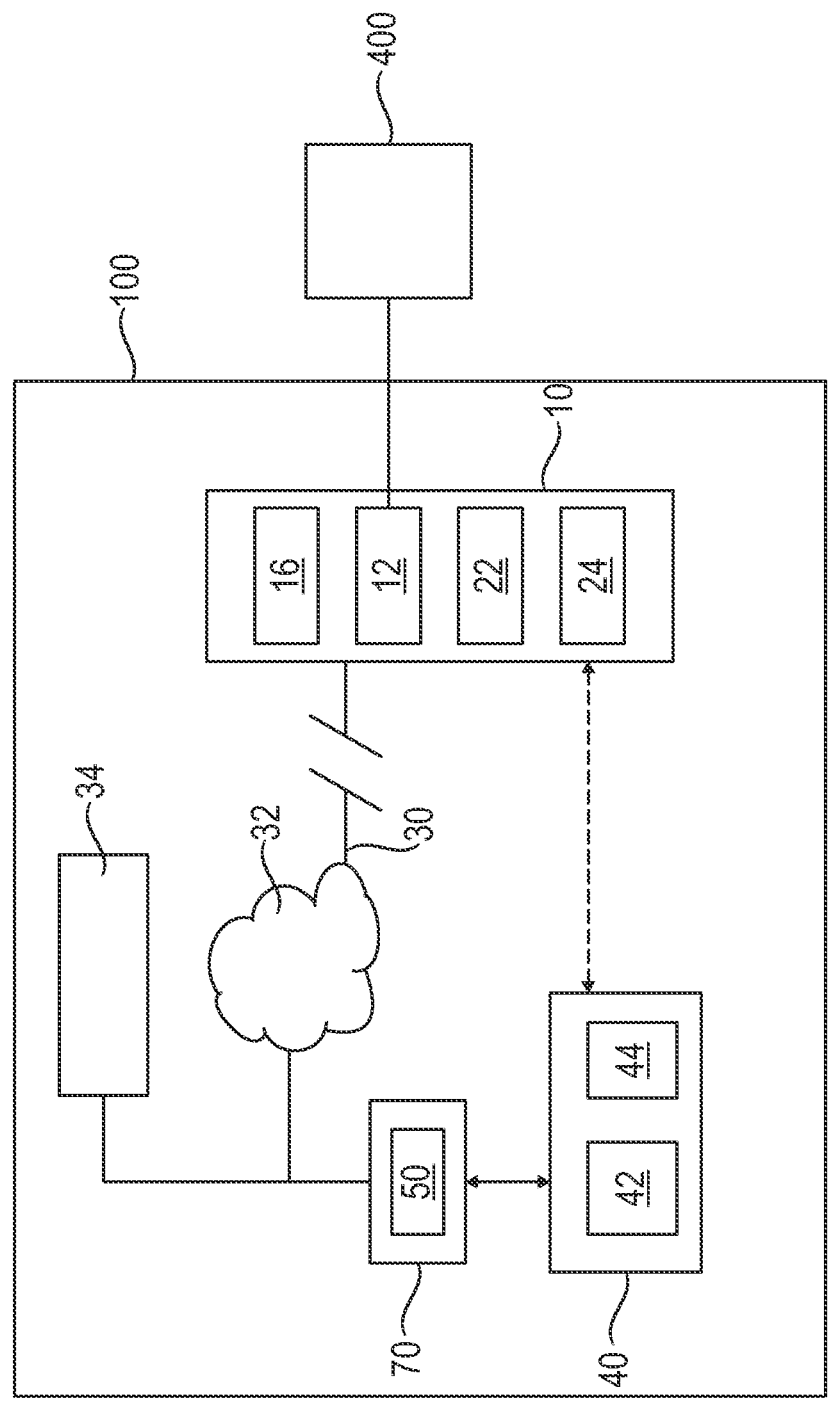
FIG. 2 shows a block diagram for generating an authentication code.

As shown in FIG. 2, the second possibility entails the use of a dynamic authentication code 50 according to a seed and key method. In this case, communication between the mobile device 40 and the network 32 and the server 34 remains possible. The charging request to the back-end server 34 can further be communicated via the mobile device 34, since the communication between the mobile device 34 and the server 34 still exists. However, since communication between the back-end server 34 and the charging station 10 is not possible, an authorization entity 70 is interposed in order to enable communication with the user and transmit a suitable authentication code 50 to said user. As a result, the user can be authorized for charging at the charging station 10.

In order to obtain the authentication code 50 from the authentication entity 70, a seed such as a 4-digit or 6-digit numeric or alphanumeric value or the telephone number of the charging station operator or the location of the charging station is indicated to the user on the display device of the user interface 16.

This may also be a 2D barcode (QR code) with and without a web link.

The user now contacts the authentication entity 70 by means of their mobile device 40. The authentication entity 70 has access to the server 34 so that a user-related billing for the charged energy output is possible even if the communication connection between the server 34 and the charging station 10 is interrupted.

The contact with the authentication entity 70 can be established by calling the displayed telephone number, by opening a website or a web application or by sending an SMS. The user forwards the seed displayed to them on the display device of the user interface 16 to the authentication entity 70, for example by means of a keypad input on their mobile device 40, by visiting a website or by phoning a call center by reading aloud the displayed seed. On the basis of the seed communicated by the user, the authentication entity 70 then calculates an authentication code 50 and communicates it to the user, preferably by displaying it on their mobile device 40. In particular, the SA2 algorithm according to the UDS standard, as set out, for example, at https://udsoncan.readthedocs.io/en/latest/udsoncan/intro.html), can be used. The user then enters this authentication code 50 on the input device of the user interface 16. If the input is correct, the charging procedure can be started. However, if, for example, an incorrect authentication code 50 is entered three times, the authentication process is interrupted and a charging procedure is not possible.

In a further example embodiment, it can be provided that a detection of a transponder such as an RFID card on the reading device 18 of the charging station 10 is required in addition to the input of the authentication code 50. The certainty that only authorized users use the charging station 10 for a charging procedure can thereby be increased.

The authentication code 50 can further be transmitted in cryptographically encrypted form from the authentication entity 70 to the mobile device 40.

Figure 3:
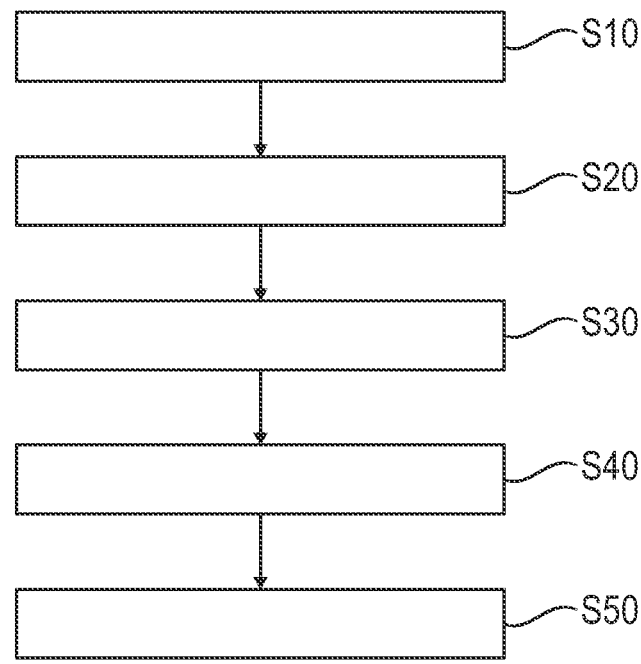
FIG. 3 shows a flow diagram to explain the individual method steps of the method according to the first aspect of the present invention.

FIG. 3 shows the method steps for authenticating a charging procedure for an electric vehicle 400 at a charging station 10.

In a step S10, the communication module 24 checks whether a connection exists to a network 32 and to a back-end server 34.

In a step S20, the communication module 24 establishes that no connection exists to the network 32 and to the back-end server 34 and communicates this information to the processor 14.

In a step S30, the processor 14 generates a message on a display device of a user interface 16 indicating that the input of an authentication code 50 is required in order to enable the charging procedure.

In a step S40, the input of the authentication code 50 is compared with an authentication code stored in a storage unit 20 of the charging station.

In a step S50, the charging procedure is authorized and enabled if the entered and stored authentication codes match one another, or is refused if said authentication codes do not match one another.

Figure 4:
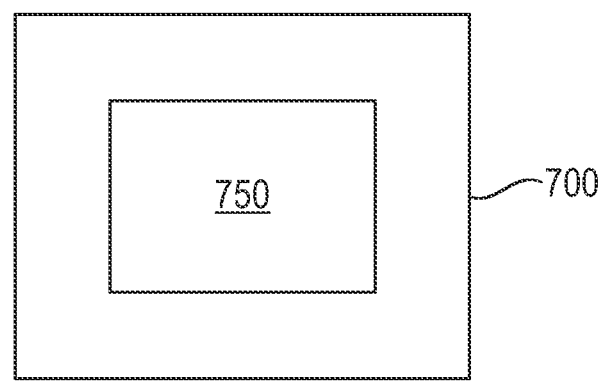
FIG. 4 shows schematically a computer program product according to one embodiment of the third aspect of the invention.

FIG. 4 shows schematically a computer program product 700 which comprises an executable program code 750 which is configured to carry out the method according to the first aspect of the present invention when it is executed.

An automatic switchover from an authentication method by means of a network connection to an authentication method by means of an input of an authentication code 50 on the user interface 16 of the charging station 10 can be reliably performed with the method according to the present invention. It is thus ensured that the charging of an electric vehicle 400 is safeguarded for a group of users authorized for this purpose, even if the network connection 30 is interrupted.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for authenticating a charging procedure for an electric vehicle at a charging station, comprising:
checking, by a communication module, whether a connection exists to a network and to a back-end server;
establishing, by the communication module, that no connection exists to the network and to the back-end server, and communicating that no connection exists to a processor;
generating a message on a display device of a user interface indicating that an input of an authentication code is required to enable the charging procedure;
comparing an entered authentication code with an authentication code stored in a storage unit of the charging station, wherein a detection of a transponder on a charging device of the charging station is required in addition to the input of the authentication code; and
authorizing and enabling the charging procedure if the entered and stored authentication codes match one another, or refusing the charging procedure if the authentication codes do not match one another.

2. The method of claim 1, wherein the authentication code comprises a 4-digit or 6-digit numeric or alphanumeric PIN code.

3. The method of claim 1, wherein the authentication code is generated in a seed and key method.

4. The method of claim 3, wherein a seed is shown on the display device of the user interface and is transmitted by a mobile application of a mobile device to an authentication entity, and
wherein the authentication entity calculates an authentication code based on the seed and transmits the authentication code to the mobile application on the mobile device.

5. The method of claim 4, wherein the authentication entity is connected to the back-end server.

6. The method of claim 4, wherein the authentication code is transmitted in cryptographically encrypted form from the authentication entity to the mobile device.

7. A system for authenticating a charging procedure for an electric vehicle at a charging station, comprising:
a charging station having a charging device and an energy source, a user interface, a storage unit, a processor, and a communication module,
wherein the charging station is connectable via the communication module by a mobile radio link to a network and to a back-end server,
wherein a mobile device is connectable to the network, the back-end server, and the communication module of the charging station,
wherein a mobile application is installed on the mobile device,
wherein the communication module is configured to check whether a connection exists to the network and to the back-end server, and, if no connection exists to the network and to the back-end server, to communicate that no connection exists to the processor,
wherein the processor is configured to generate a message on a display device of the user interface indicating that an input of an authentication code is required in order to enable the charging procedure, to compare an entered authentication code with an authentication code stored in a storage unit of the charging station, and to authorize and enable the charging procedure if the entered and stored authentication codes match one another, or to refuse the charging procedure if the authentication codes do not match one another, and wherein a detection of a transponder on the charging device of the charging station is required in addition to the input of the authentication code.

8. The system of claim 7, wherein the authentication code comprises a 4-digit or 6-digit numeric or alphanumeric PIN code.

9. The system of claim 7, wherein the authentication code is generated in a seed and key method.

10. The system of claim 9, wherein a seed is shown on the display device of the user interface and is transmitted by the mobile application of the mobile device to an authentication entity, and
wherein the authentication entity calculates an authentication code based on the seed and transmits the authentication code to the mobile application on the mobile device.

11. The system of claim 10, wherein the authentication entity is connected to the back-end server.

12. The system of claim 10, wherein the authentication code is transmitted in cryptographically encrypted form from the authentication entity to the mobile device.

13. A computer program product, comprising:
executable program code that when executed carries out the method of claim 1.

14. The method of claim 1, wherein a detection of a transponder on the charging device of the charging station is required in order to input the authentication code.

15. The system of claim 7, wherein a detection of a transponder on the charging device of the charging station is required in order to input the authentication code.

* * * * *